(12) United States Patent
Terry (10) Patent No.: US 8,375,006 B2
(45) Date of Patent: Feb. 12, 2013

(54) ANALYZING INTERNAL HARD DRIVES AND CONTINUOUSLY AUTHENTICATING PROGRAM FILES WITHIN A 32/64 BIT OPERATING SYSTEM (75) Inventor: Robert F. Terry, Old Hickory, TN (US)

(73) Assignee: CW International, LLC, Ellwood City, PA (US)

( * ) Notice: Subject to any disclaimer, the term of this patent is extended or adjusted under 35 U.S.C. 154(b) by 348 days.

(21) Appl. No.: 12/440,320

(22) PCT Filed: Sep. 7, 2007

(86) PCT No.: PCT/US2007/077915
§ 371 (c)(1),
(2), (4) Date: Apr. 26, 2010

(87) PCT Pub. No.: WO2008/031055
PCT Pub. Date: Mar. 13, 2008

(65) Prior Publication Data
US 2010/0293151 A1    Nov. 18, 2010

Related U.S. Application Data

(60) Provisional application No. 60/824,825, filed on Sep. 7, 2006.

(51) Int. Cl.
*G06F 17/30* (2006.01)

(52) U.S. Cl. ..................................................... 707/688
(58) Field of Classification Search ............... 707/688; 713/187; 726/24, 3; 714/46; 705/51
See application file for complete search history.

(56) References Cited

U.S. PATENT DOCUMENTS

| | | | |
|---|---|---|---|
| 2003/0115509 A1* | 6/2003 | Dubal | 714/46 |
| 2004/0098599 A1* | 5/2004 | Bentley | 713/187 |
| 2006/0031937 A1* | 2/2006 | Steinberg | 726/24 |
| 2006/0070118 A1* | 3/2006 | Munson et al. | 726/3 |

OTHER PUBLICATIONS

International Application No. PCT/US07/77915—International Search Report and Written Opinion of the International Searching Authority mailed Mar. 25, 2008.

* cited by examiner

*Primary Examiner* — Sheree Brown
(74) *Attorney, Agent, or Firm* — Miles & Stockbridge P.C.; David R. Schaffer, Esq.

(57) ABSTRACT

A method of performing an analysis on internal hard drive(s), which includes an analysis of the file management system, individual files that exist on the hard drive, developing a Unique ID for each program (i.e., executable) file and continuously analyzing (i.e., scanning) the hard drive(s) to detect physical changes in the previously analyzed program files. The method may be implemented on a computer unit, which can be a 32/64-bit Microsoft PC O/S, or a 32/64-bit Microsoft Server O/S.

27 Claims, 9 Drawing Sheets

ANALYZING INTERNAL HARD DRIVES AND CONTINUOUSLY AUTHENTICATING PROGRAM FILES WITHIN A 32/64 BIT OPERATING SYSTEM

CROSS REFERENCE TO RELATED APPLICATION

This application claims benefit of priority to U.S. Provisional Patent Application No. 60/824,825, filed Sep. 7, 2006, which is herein incorporated in its entirety by reference.

FIELD OF THE INVENTION

This method of invention relates generally to the field of operating system (O/S) utility professional programming, and more particularly but not exclusively, to operating systems and methods of performing an analysis on all the internal hard drives, the O/S file management system, performing an analysis on each existing specific file, and authenticating the file integrity of each executable program file.

BACKGROUND OF INVENTION

As electronic connectivity, networking and automation expands in business and organizations, as data (information) and file transfers become faster, and while the number of unauthorized programs, viruses, malicious mobile code, spyware, etc., grows to new levels on a daily basis, there is an increasing need for a new technology that organizations can utilize to address these threats in a manner that is not limited by traditional file signature methods of protecting the internal file contents of 32/64-bit Microsoft computer hard drive(s) and devices that connect to 32/64-bit Microsoft computers.

As an example, a Microsoft 32-bit computer, or a 64-bit Microsoft computer, may be connected to a network, which is connected to the Internet, which is further connected to several other networks via gateways that are referred to in this document as "connection points", which may allow data to be automatically transferred to/from any "connection point" to that particular computer. As the internal threat of corporate espionage grows greater and greater on a daily basis, the installation of unauthorized software from those individuals who have the authority to manage and control networks is also growing on a daily basis. The terms Microsoft PC, Microsoft Server, Microsoft computer, Microsoft 32-bit computer, and/or any other similar variations and combinations using Microsoft to describe a specific computer, device and/or server may be used interchangeably to mean a computer, device and/or server on which a Microsoft operating system (O/S) is implemented.

The overall problem that exists in most of the technology utilized in today's modern computing environment, is that the number of viruses, malicious mobile code, spyware, unauthorized programs has grown to such a large number, that it requires, at a minimum, daily electronic updates to maintain a file signature database on known viruses, etc., which could require hours to receive a daily update and scan an individual computer for the possible new viruses. Furthermore, the computer must not only be scanned for new viruses, but also for previous known viruses that are still being electronically transmitted across the Internet. The requirement to receive an update and scan an individual computer requires such a significant amount of network and computer resources that it significantly affects a users ability to utilize a networked computer during a normal daily scan for possible viruses, etc.

Because of the problems described above, a new technology (i.e., a utility) is needed that can take advantage of an existing operating system (O/S) file management system to perform an analysis of any internal hard drive(s) in a computer (e.g., as used herein a "Microsoft computer" is defined to include any computer running a computer and/or server O/S from Microsoft Corporation of Redmond Wash.). The utility may determine all executable program files, regardless of the file naming convention used to name the files and use an algorithm to establish a unique ID for each executable program file located on the hard disk. When the analysis is complete, the utility may continue to cycle (i.e., scan) all of the hard drive(s) to insure (i.e., maintain) the integrity of each specific program file, detect any unauthorized change to any specific program file, and detect any new unauthorized program file that might be installed anywhere within the computers internal hard drive(s).

Information system industry experts, who understand the latest features and capabilities about operating system (O/S) design and development and that are familiar with kernel operations, are aware that the ability to intercept kernel events is a major key to providing adequate security to an O/S. While the 32/64-bit Microsoft O/S kernel provides a mechanism to intercept many events, there is currently no known mechanism available that would allow a security solution to receive a kernel event or notification that a file transfer protocol (i.e., a file download/upload) is about to start, for 100% of the programs that have the ability to transfer files in and out of a networked computer. Because there is no such kernel mechanism currently available, and no known development plans at this time in future O/S's (e.g., Vista, etc.), to intercept and control 100% of all program file transfer activity, a solution is needed that provides the ability to detect physical changes in existing program files and detect the installation of new program files. Preferably, the solution may co-exist as an O/S utility with the O/S file management system and have the ability to independently perform an analysis (i.e., scan) and maintain the authorized integrity on every program file that exists within the Microsoft computer.

SUMMARY

In various embodiments, the present invention includes (i.e., comprises) a method of executing and performing an analysis of a 32/64-bit Microsoft computer's internal hard drive(s), determining whether each file that exists on the hard drive(s) is an executable program file, establishing a unique ID for that specific program file, and establishing a program utility that co-exists with the O/S file management system to perform a constant analysis (i.e., scan) on the hard drives(s) in the computer, and to detect physical state changes on all existing executable program files or detect the presence of new executable program files.

BRIEF DESCRIPTION OF DRAWINGS

Non-limiting and non-exhaustive embodiments of the present invention are described with reference to the following figures, wherein like reference numerals refer to like parts throughout the various views unless otherwise precisely specified.

DETAILED DESCRIPTION OF ILLUSTRATED EMBODIMENTS

In the description herein, general details are provided in flow diagrams, to provide a general understanding of the programming methods that will assist in an understanding of embodiments of the inventive method. One skilled in the relevant art of programming will recognize that the inventive method of the present invention may be practiced without one or more specific details, or in other programming methods. Terms referenced throughout this specification to "one embodiment" or "an embodiment" means that a particular feature, structure or characteristic described in connection with the embodiment is included in at least one embodiment of the present invented method. Thus, the appearance of the phrases "in one embodiment" or "in an embodiment" in places throughout this specification are not necessarily all referring to the same embodiment. Furthermore, the particular features, structures, or characteristics may be combined in any suitable manner in one or more embodiments.

In accordance with one or more embodiments of the present invention, a method may include (i.e., comprise) performing an analysis on all the internal hard drives and the O/S file management system, performing an analysis on each existing specific file to determine whether those files are executable program files, establishing a Unique ID for each executable program file and continuously cycling (scanning), the hard drive and the file management system, and authenticating the file integrity of each specific executable program file in an extremely efficient manner.

In accordance with one or more embodiments of the present invention, the O/S utility may be developed or implemented in a variety of programming languages ranging from low-level, programming languages (e.g., but not limited to, assembler) to high-level programming languages (e.g., but not limited to, C++, Visual Basic, Java, Java Beans, etc.). The O/S utility may be stored or encoded as an executable file on a machine-readable and/or a computer-readable medium (e.g., but not limited to, a floppy disk, a hard drive, a flash drive, a bubble memory, a Read Only Memory (ROM), a Random Access Memory (RAM), or the like) and/or hard-wired into one or more integrated circuits (e.g., an Electrically Erasable Programmable Read Only Memory (EEPROM), an Erasable Programmable Read Only Memory (EPROM), etc.).

Figure 1:
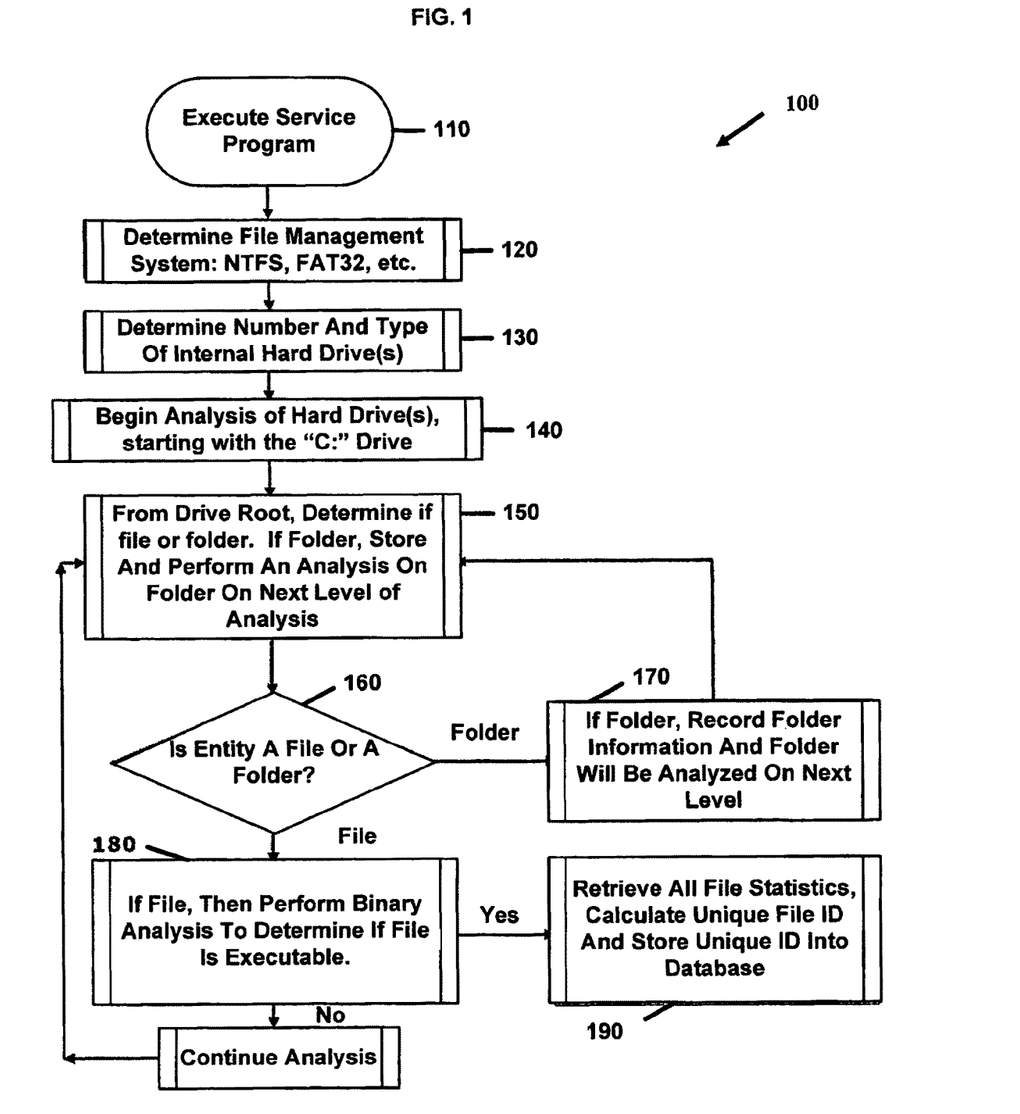
FIG. 1 is a general flow diagram of a method of performing an analysis of all internal hard drive(s), a file management system, and each specific file to determine whether a file is an executable program file and to calculate a Unique ID for each executable program file, in accordance with at least one embodiment of the present invention.

FIG. 1 is a general flow diagram of a method 100 for executing and performing an analysis of all internal hard drive(s), a file management system, and each specific file in a computer to determine whether a file is at least one executable program file and to calculate a Unique ID for each executable program file, in accordance with at least one embodiment of the present invention. In FIG. 1, an O/S utility program can execute (110) as a service, for example, from the time the computer is powered-on (i.e., booted-up), determine (120) what kind of an O/S file system is configured within the file management system, such as, for example, NTFS, FAT32, etc., and then query the internal O/S to determine (130) a number and a type for each internal hard drive device starting with, for example, a first or "C:" hard drive, a size of each device, and other significant information regarding each internal hard drive device in the computer.

In FIG. 1, the analysis next can determine (150) whether each entity on the computer is either a file or a folder starting with the ROOT SEGMENT of each internal hard drive, and perform an analysis of each entity that resides within the file management system. If the entity is determined (150) to be a folder, then the folder can be stored (160) into a database table and an array element to be analyzed on the next level of analysis to be performed by the utility program. The analysis next can loop back to determine (150) whether the next entity is a file or a folder. If the entity is determined (150) to be a file, then a binary scan of the file can be performed to determine (170) whether the file is a compiled binary executable program or a script executable program. If the file is determined (170) to be an executable program, then all program file information and statistics may be retrieved (180) and a Unique File ID generated for this specific file and stored into the array element and into the database table. Regardless of the whether the file is determined (170) to be a compiled binary executable program or a script executable program, the analysis loops back to determine (150) whether the next entity is a file or a folder.

Figure 2:
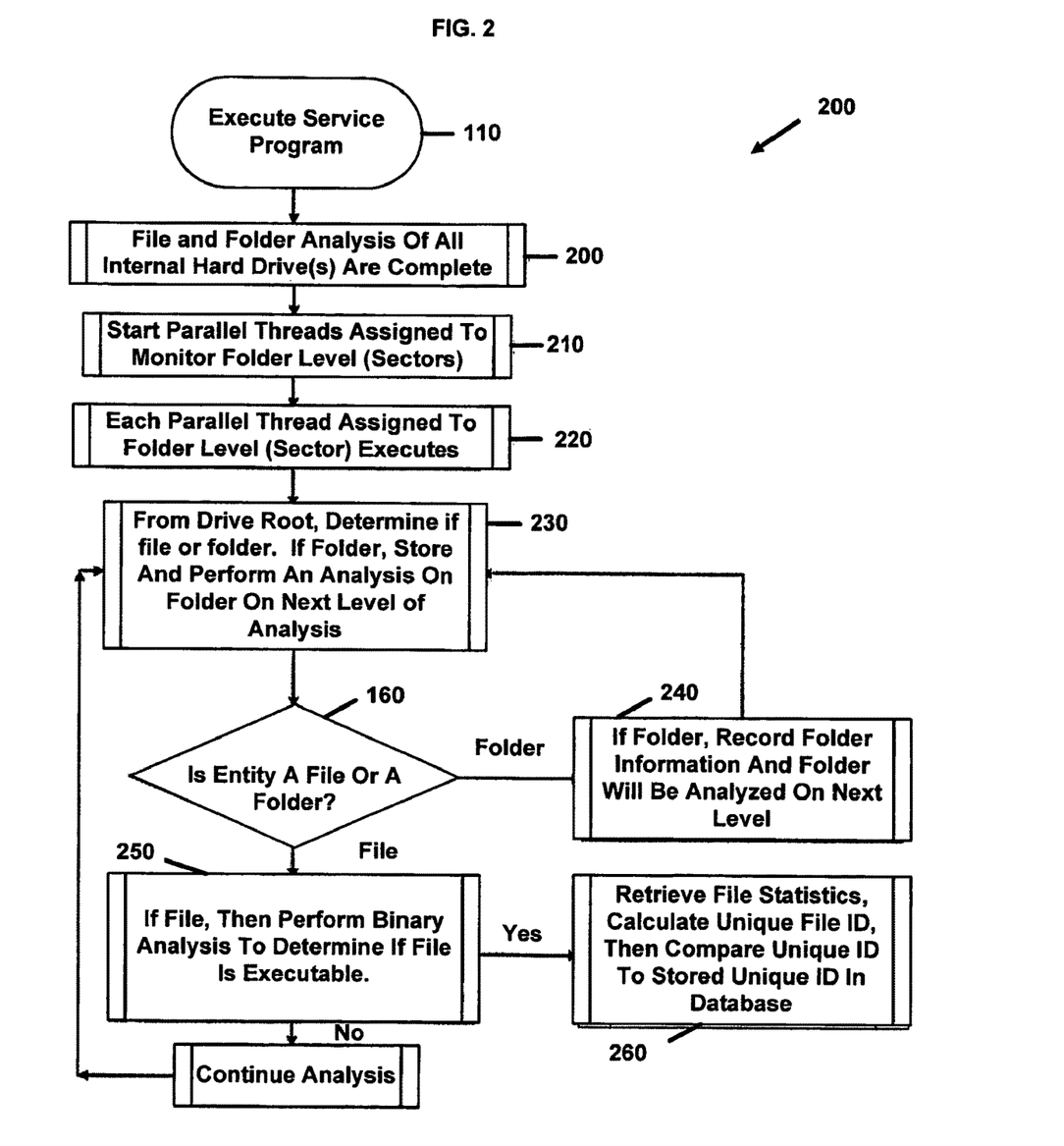
FIG. 2 is a general flow diagram of a method designed to execute after the analysis of FIG. 1 is complete to continuously perform an analysis (i.e., scan) of the internal hard drive(s), independently coexist with the file management system, maintain the integrity of each executable program file, detect any physical change to a program file, and detect the existence (i.e., installation) of new program files, in accordance with at least one embodiment of the present invention.

FIG. 2 is a general flow diagram of a method 200 performed after the analysis of FIG. 1 is complete, to continuously perform an analysis (i.e., scan) of the internal hard drive(s), independently coexist with the file management system, maintain the integrity of each executable program file, detect any physical change to a program file, and detect the existence (i.e., installation) of new program files, in accordance with at least one embodiment of the present invention. In FIG. 2, the initial program utility automatically starts (110) a continuous analysis of the internal hard drive(s), after the initial analysis of the hard drives is completed at 200 to establish an internal baseline for integrity comparison and authentication.

Beginning the continuous analysis (i.e., scan) by executing parallel threads (210, 220) starting at the root of each hard drive, the utility program determines (230) whether each entity is a file or folder. If the entity is determined (160) to be a new, unrecorded folder, folder information may be recorded into an array, stored in a database and passed to a parallel thread to perform an analysis on the contents of the folder. If the folder already exists in the database, then the folder will be analyzed on the next level of folder (sector) analysis perform by the utility program.

If the entity is a file, the utility program will determine (250) whether the file is an executable program file. If the file is determined (250) to be an executable program file, all critical file statistics and information may be retrieved from the file and a Unique ID may be calculated (260) based on this information. If the file Unique ID calculated (260) does not match the Unique ID stored in the database, or the Unique ID does not exist in the database, either means that an unauthorized modification to the executable program file occurred, or the presence of a new executable program file was detected.

Figure 3:
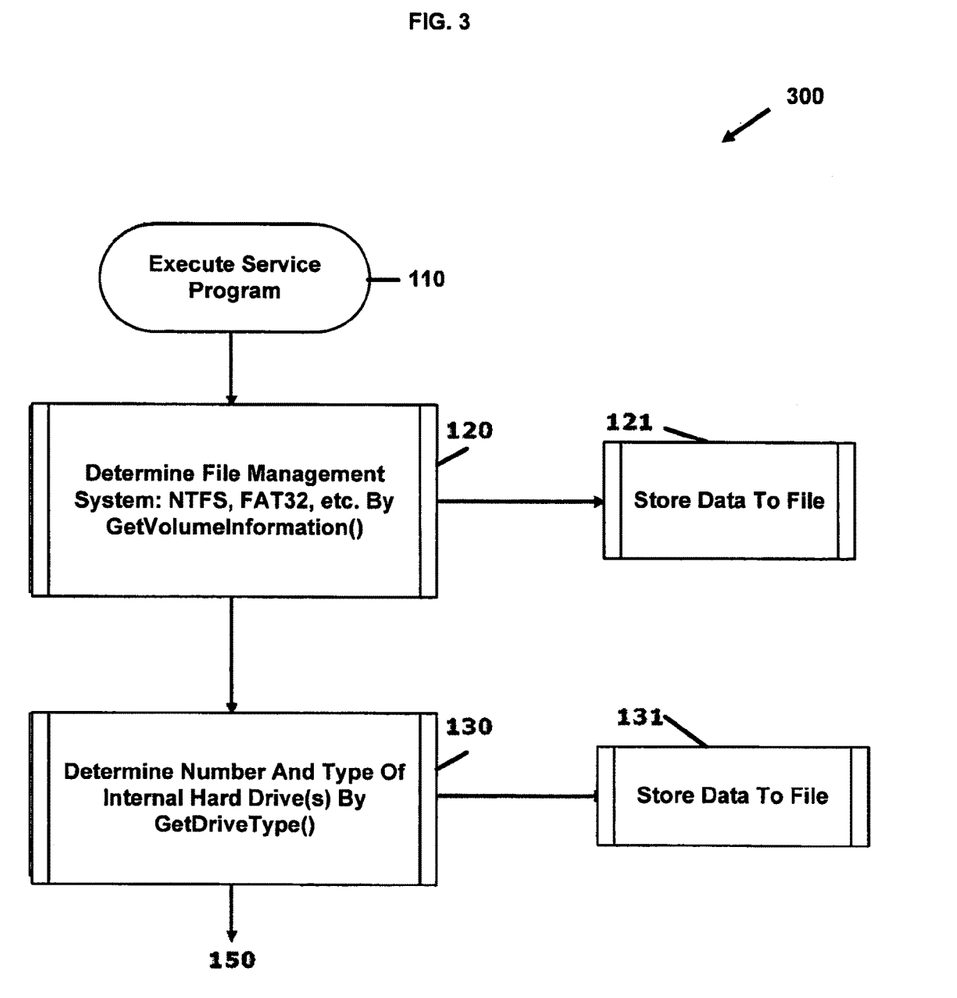
FIG. 3 is a detailed flow diagram of a method of determining the type of file management system (NTFS or FAT32) and the number of internal hard drives available in the computer, in accordance with at least one embodiment of the present invention.

FIG. 3 is a detailed flow diagram of a method 300 to determine the type of file management system (NTFS or FAT32) and the number of internal hard drives available in the computer, in accordance with at least one embodiment of the present invention. In FIG. 3, the method 300 of performing an initial analysis of an operating system, for example, but not limited to, a Microsoft operating system, is illustrated. In the method 300, once the service is executed (110), the file management system can be analyzed by calling (120) a GetVolumeInformation( ) function to retrieve all information regarding the volume and that is then stored (121) within a data file.

In FIG. 3, once the file management system is determined, the number of internal hard (i.e., logical) drives can be determined by calling (130) a GetDriveType( ) function to obtain all information regarding the number and type of internal hard (i.e., logical) drives and the statistics may be stored (131) within a data file.

Figure 4:
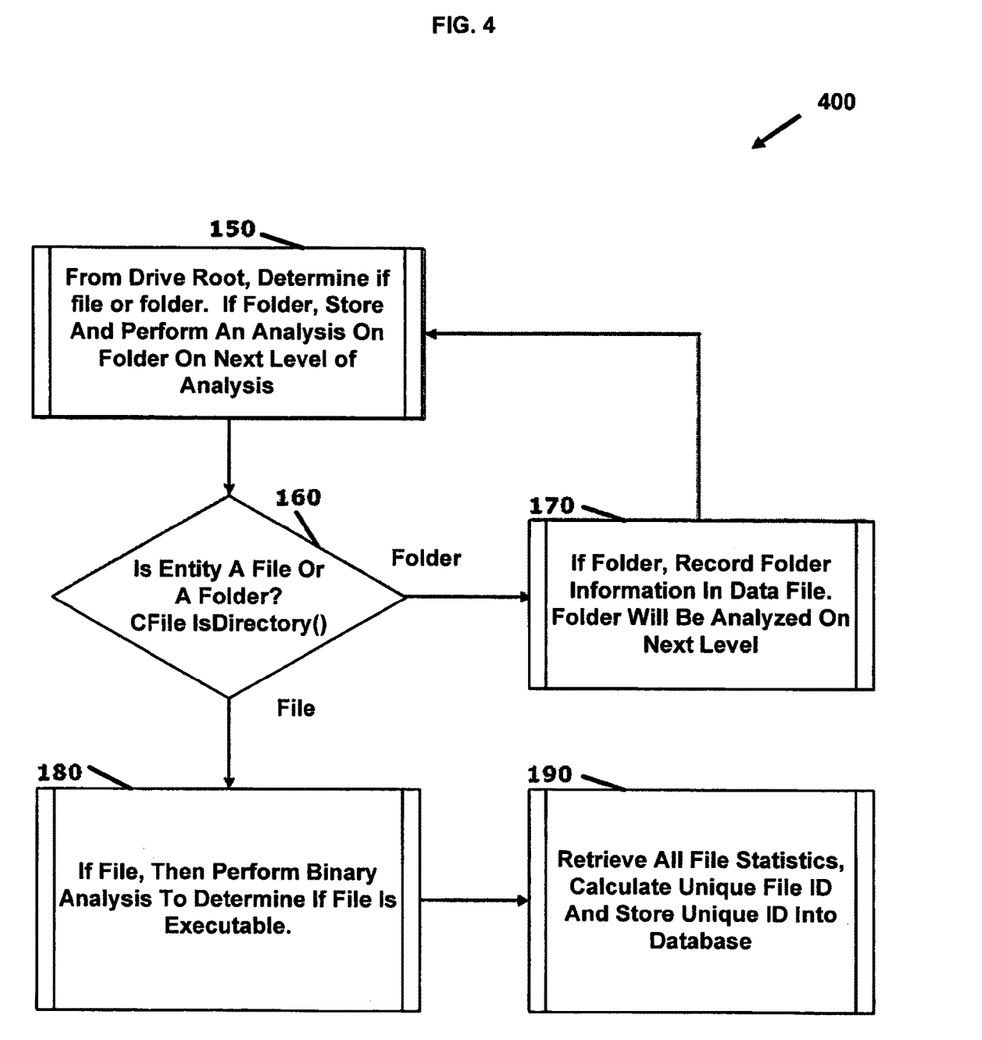
FIG. 4 is a detailed flow diagram of a method of determining the root of the first logical hard drive, perform a complete analysis of the logical hard drive in determining and recording each folder and file located, and determine whether the file is actually an executable file (i.e., a binary or a script file), in accordance with at least one embodiment of the present invention.

FIG. 4 is a detailed flow diagram of a method 400 to determine the root of the first logical hard drive, perform a complete analysis of the logical hard drive in determining and recording each folder and file located, and determine whether the file is actually an executable file (i.e., a binary or a script file), in accordance with at least one embodiment of the present invention. As shown in FIG. 4, the method 400 can include initiating an analysis at the root of the primary hard (i.e., logical) drive to continuously performing an analysis of the entire hard (i.e., logical) drive until all folders and files have been identified, categorized and/or recorded by the service program.

In FIG. 4, if an entity is detected and it is determined (150) to be a folder, the folder information is stored (160) within a data file and the data can be passed into an array for an analysis to be performed on the folder during the next analysis level when the contents of the folder (e.g., files and subfolders) will be analyzed. If an entity is detected and it is determined (150) to be a file, then a binary analysis is performed (170) to determine if the file is an executable program. If it is determined (170) that the file is an executable program, a series of functions are performed (180) to determine the file's vital statistics and calculate (190) a Unique ID that can be stored into a data file (i.e., a database) record.

Figure 5:
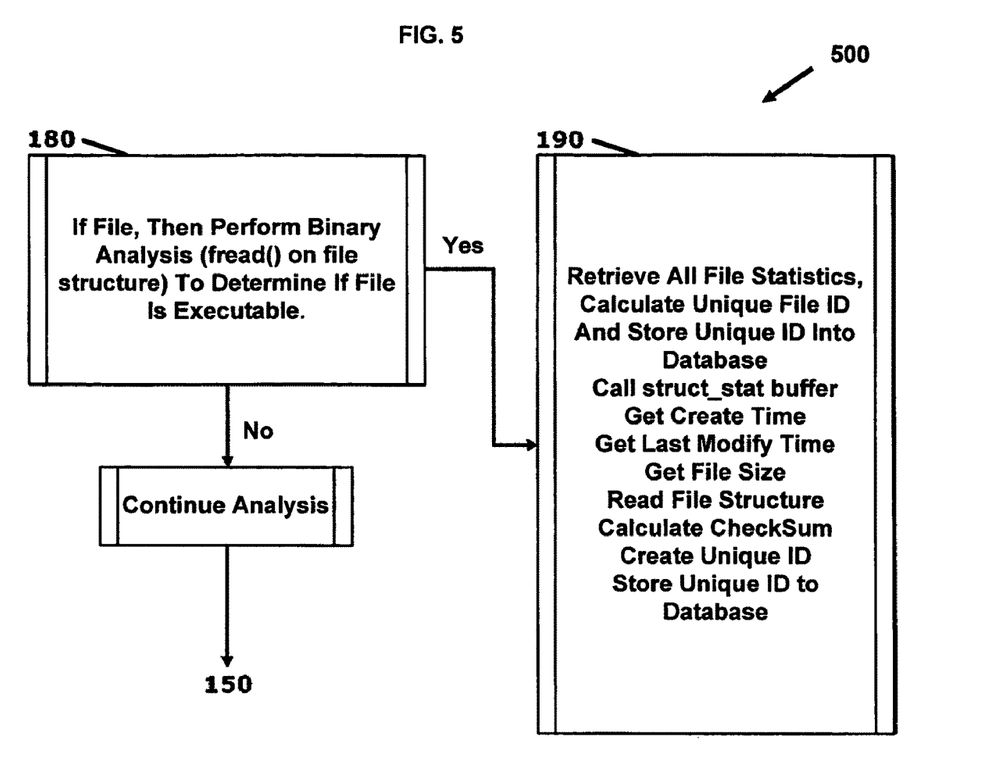
FIG. 5 is a detailed flow diagram a method of recording the file statistics after locating an executable binary or script (program) file, in accordance with at least one embodiment of the present invention.

FIG. 5 is a detailed flow diagram that defines a method 500 for recording the file statistics after locating an executable binary or script (program) file, in accordance with at least one embodiment of the present invention. In FIG. 5, if the file is determined (180) not to be an executable file, then the analysis moves on to analyze the next entity. The determination (180) may be performed using a binary analysis on the file structure with the fread( ) function, as discussed below. If the file is determined (180) to be an executable file, then a Unique ID is calculated (190) for the file and stored into a database.

In FIG. 5, the determination (180) may involve the binary read conducting a fopen( ) "br" parameters, then calling a fread( ) to examine the first 30 bytes of the file. Once the first 30 bytes of the file are extracted and loaded into a memory, a series of functions can be executed to determine (180) the type of file and if the file is an executable file. If the binary read determines (180) that the file is an executable file, a series of functions are performed (190) to calculate (i.e., establish) a Unique ID. These functions may include, without limitation:

1) Declaring a struct _stat buffer.
2) Retrieving a file create date/time from the _stat buffer.
3) Retrieving a file last modification date/time from the _stat buffer.
4) Retrieving a file size from the _stat buffer.
5) Calculating a checksum using an industry standard algorithm, for example, an MD-5 algorithm.

The equation to create the Unique ID can be, generally, based on converting all data into a series of strings and appending some or all of the strings to formulate a Unique ID. The Unique ID may be stored to identify the file each time the assigned parallel thread cycles the folder and performs an analysis on the specific file. For example, the Unique ID may be created by appending strings in the following order, file size first, last modification time second, and checksum third. Or, in other words: Unique ID=File Size+Last Modification Time+Checksum, where the "+" signs represent a string concatenation operator.

Table 1 provides a list of industry standard file types and how they are identified by their specific file structure. When the binary read is performed on the specific file and the file is determined (180) to be an executable file, as in FIG. 5, a reference may also be made to Table 1, to refer to the industry standard chart of file headers and specifically which headers relate to each file type created within a Microsoft PC or server operating system. Specifically, Table 1 lists "Executable files" and those bytes, which specifically identify an executable (binary) file. Should the file contain bytes that identify it as an executable file, then it is determined (180) to be an executable file.

TABLE 1

| File type | Typical extension | Hex digits | ASCII digits |
|---|---|---|---|
| Image files | | | |
| Bitmap format | .bmp | 42 4d | BM |
| FITS format | .fits | 53 49 4d 50 4c 45 | SIMPLE |

TABLE 1-continued

| File type | Typical extension | Hex digits | ASCII digits |
|---|---|---|---|
| GIF format | .gif | 47 49 46 38 | GIF8 |
| Graphics Kernel System | .gks | 47 4b 53 4d | GKSM |
| IRIS rgb format | .rgb | 01 da | .. |
| ITC (CMU WM) format | .itc | f1 00 40 bb | .... |
| JPEG File Interchange Format | .jpg | ff d8 ff e0 | .... |
| NIFF (Navy TIFF) | .nif | 49 49 4e 31 | IIN1 |
| PM format | .pm | 56 49 45 57 | VIEW |
| PNG format | .png | 89 50 4e 47 | .PNG |
| Postscript format | .[e]ps | 25 21 | %! |
| Sun Rasterfile | .ras | 59 a6 6a 95 | Y.j. |
| Targa format | .tga | xx xx xx | ... |
| TIFF format (Motorola - big endian) | .tif | 4d 4d 00 2a | MM.* |
| TIFF format (Intel - little endian) | .tif | 49 49 2a 00 | II*. |
| X11 Bitmap format | .xbm | xx xx | |
| XCF Gimp file structure | .xcf | 67 69 6d 70 20 78 63 66 20 76 | gimp xcf |
| Xfig format | .fig | 23 46 49 47 | #FIG |
| XPM format | .xpm | 2f 2a 20 58 50 4d 20 2a 2f | /* XPM */ |
| Compressed files | | | |
| Bzip | .bz | 42 5a | BZ |
| Compress | .Z | 1f 9d | .. |
| gzip format | .gz | 1f 8b | .. |
| pkzip format | .zip | 50 4b 03 04 | PK.. |
| Archive files | | | |
| TAR (pre-POSIX) | .tar | xx xx | (a filename) |
| TAR (POSIX) | .tar | 75 73 74 61 72 | ustar (offset by 257 bytes) |
| Execcutable files | | | |
| MS-DOS, OS/2 or MS Windows | | 4d 5a | MZ |
| Unix elf | | 7f 45 4c 46 | .ELF |
| Miscellaneous files | | | |
| pgp public ring | | 99 00 | .. |
| pgp security ring | | 95 01 | .. |
| pgp security ring | | 95 00 | .. |
| pgp encrypted data | | a6 00 | ¦. | xx = variable
. = not an ASCII char

Table 2 lists the industry standard architecture of an actual "EXE" binary file, which is a binary program that can execute within a Microsoft PC or Server O/S. Table 2 specifically identifies the "industry standard" first 27 bytes of a Microsoft Executable (binary) file and which byte to reference to determine the proper data according to each particular executable (binary) file.

TABLE 2

| Bytes | Description |
|---|---|
| 1, 2 | "MZ" - Link file .EXE signature |
| 3, 4 | length of image mod 512 |
| 5, 6 | size of file in 512 byte pages |
| 7, 8 | number of relocation items following header |
| 9, 10 | size of header in 16 byte paragraphs, used to locate the beginning of the load module |
| 10, 11 | min # of paragraphs needed to run program |
| 13, 14 | max # of paragraphs the program would like |
| 15, 16 | offset in load module of stack segment (in paragraphs) |
| 17, 18 | initial SP value to be loaded |
| 19, 20 | negative checksum of pgm used while by EXEC loads pgm |
| 21, 22 | program entry point, (initial IP value) |
| 23, 24 | offset in load module of the code segment (in paragraphs) |
| 25, 26 | offset in .EXE file of first relocation item |
| 27 | overlay number (0 for root program) |

TABLE 3 lists an industry standard structure to read the attributes of an "EXE" binary file found in a Microsoft PC or Server operating system. The structure defined in Table 3 may also be used as a comparison (i.e., analysis) to insure the file maintains its proper integrity during the scan to retrieve (190) all file statistics, as in FIG. 5.

TABLE 3

```
Struct EXE_Header
{
    char id[2];
    unsigned last;
    unsigned pages;
    unsigned reloc_items;
    unsigned headersize;
    unsigned minpara;
    unsigned maxpara;
    unsigned ss;
    unsigned sp;
    unsigned chksum;
    unsigned ip;
    unsigned cs;
    unsigned first_reloc;
    unsigned ovr;
}
```

Figure 6:
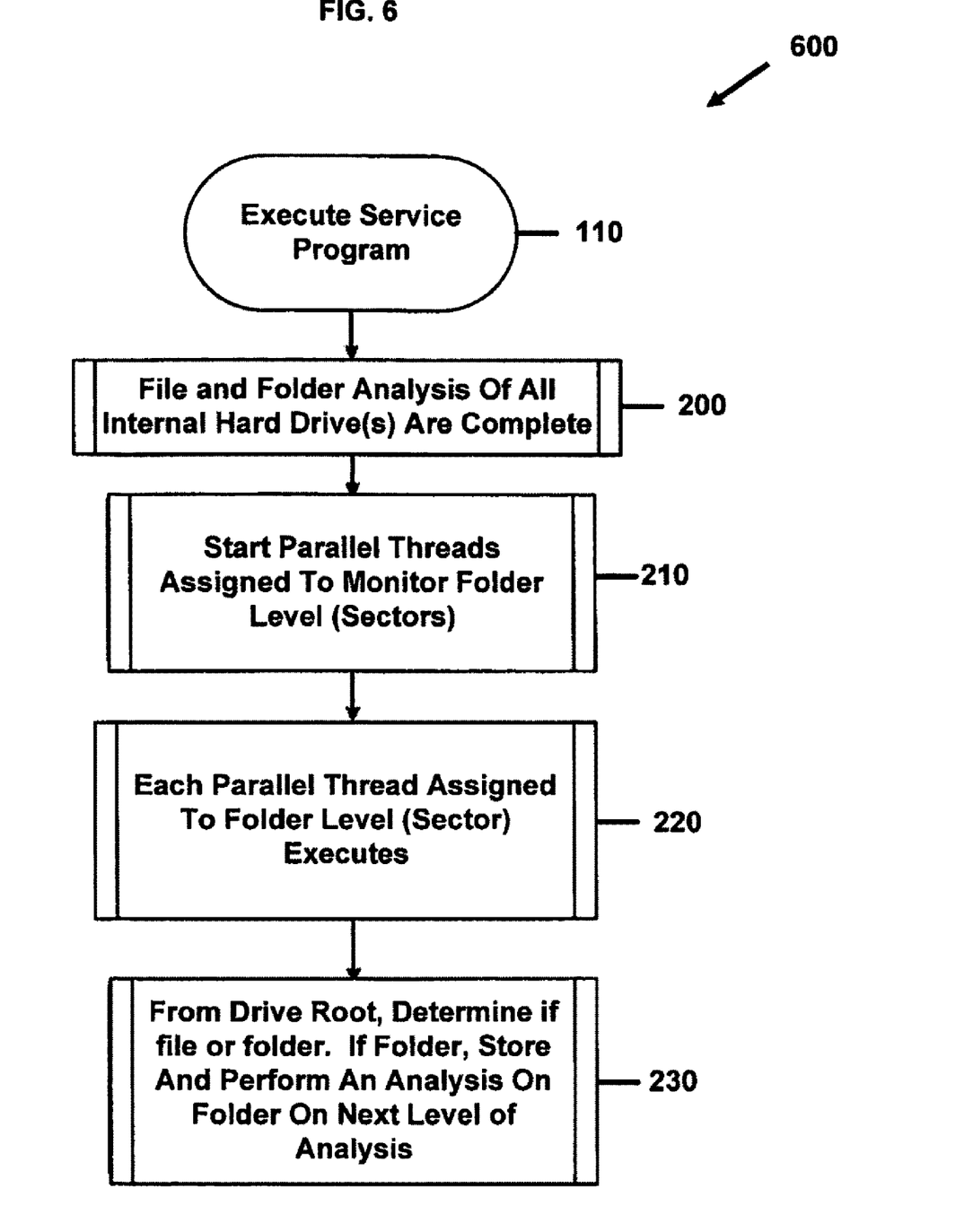
FIG. 6 is a detailed flow diagram of a method designed to be executed after an initial analysis of files on each hard drive in a system to start multiple parallel threads to continuously monitor the logical drive of the computer, in accordance with at least one embodiment of the present invention.

FIG. 6 is a detailed flow diagram of a method 600 for use, after an initial analysis of the files on the hard drive(s) has been completed, to start parallel threads to continuously monitor the logical drive of the computer, in accordance with at least one embodiment of the present invention. In FIG. 6, a continuous service program is executed (610) and some or all data regarding the configuration of the internal hard drives are retrieved (200) from the data files. Once the data is retrieved and stored to memory on all hard (logical) drives, a series of parallel threads are executed (210) to begin a continuous monitor/analysis of all hard (logical) drives. Once each parallel thread is initiated (i.e., executed) (220) to assign a folder level (i.e., a sector) to analyze, each thread may then begin to perform an analysis on all folders and files that exist within the parallel threads defined analysis sector to determine (230) whether they are a file or a folder.

Figure 7:
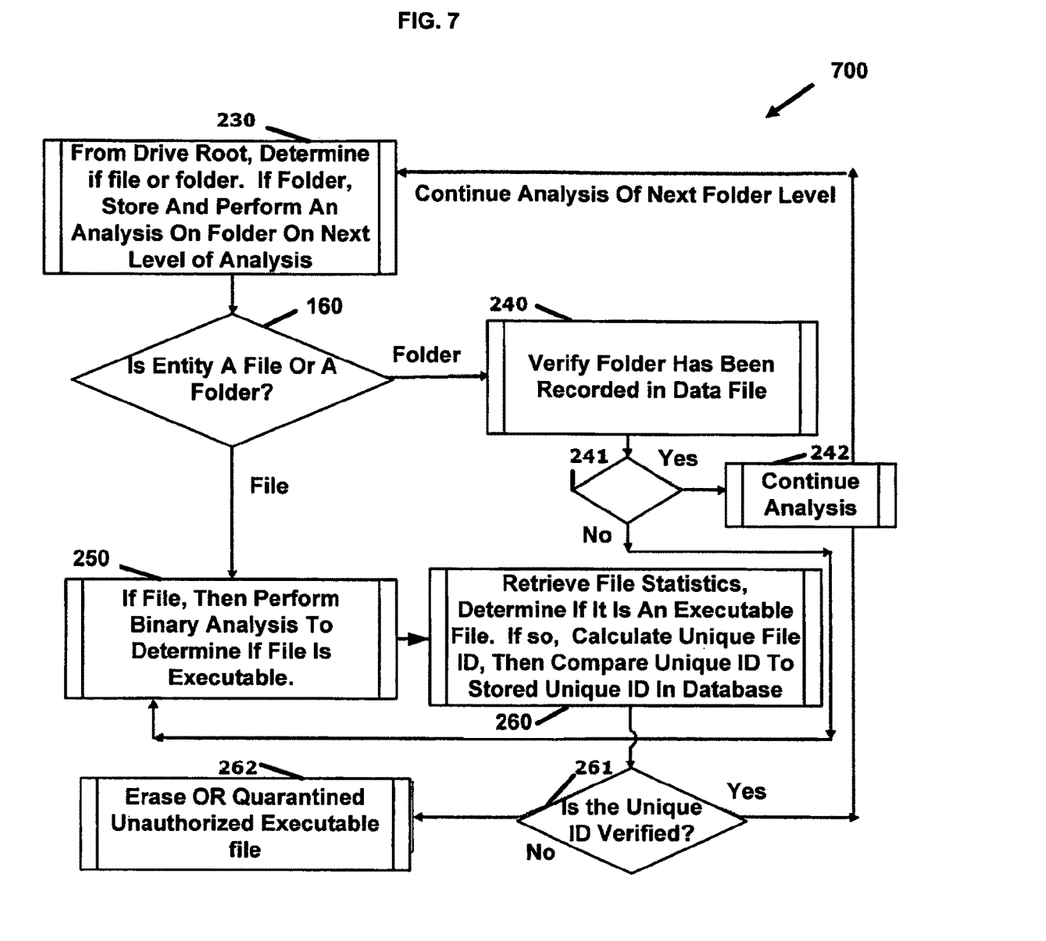
FIG. 7 is a detailed flow diagram of a method to be performed during an analysis of a folder or file detected within the operating system, in accordance with at least one embodiment of the present invention.

FIG. 7 is a detailed flow diagram of a method 700 performed during an analysis of a folder or file detected within the operating system, in accordance with at least one embodiment of the present invention. In FIG. 7, the parallel thread may determine (230) if the entity is a file or a folder and, if the entity is a folder, the folder may be checked (240) to see if it has been previously recorded in the data file. If the folder record is determined (241) to have been previously recorded, analysis of the folder may continue to be performed. If no record is found on the folder (i.e., no folder record is determined (230) to have been previously recorded), the folder may be determined to be a "new creation" and an immediate binary analysis may be performed (250) on each file within the folder. If continuous new nested folders are found within the folder, the cycle may continuously repeat performing (250) the binary analysis on each new folder, until all of the new folders are thoroughly analyzed.

In FIG. 7, if the entity is determined (230) to be a file, a binary analysis may be performed to determine (250) whether the file is executable and, if the file is determined (250) to be executable, the database may be accessed to retrieve (260) the established Unique ID for the file. If the Unique ID is retrieved (260), a new (i.e., real-time or current) Unique ID may be calculated on the file to be used to determine if any modifications to the file have occurred. A comparison may be made between the retrieved (i.e., stored) Unique ID and the new Unique ID to determine (261) if they are the same. If the retrieved Unique ID and the new Unique ID are determined (261) to be the same, then the file may be left to function normally and processing may loop back to continue processing (242) and determine (230) whether the next entity is a file or a folder. If the retrieved Unique ID and the new Unique ID are not determined (261) to be the same or the Unique ID was never recorded within the database, then the file either may be quarantined or erased as established by the policy parameters. For example, in accordance with an embodiment of the present invention, if the retrieved Unique ID and the new Unique ID do not match, the file may be assumed to be corrupted and a security risk to the computer, so the file may be erased (262) (i.e., deleted) from the hard drive. However, if the Unique ID was never recorded within the database, then the file may be quarantined (262) while the file is further analyzed to determine if it can be added to the database. If it can be added, then the file may be removed from quarantine and added to the database and processing loops back to continue processing and determine (230) if the next entity is a file or a folder.

Alternatively, in accordance with another embodiment of the present invention, if the retrieved Unique ID and the new Unique ID do not match (261), the file may be assumed to be corrupted and a security risk to the computer, but, instead of erasing the file from the hard drive, the file may be quarantined (262) while another utility program attempts to repair it. If it can be repaired, then the file may be removed from quarantine and processing may loop back to continue processing and determine (230) if the next entity is a file or a folder.

Figure 8:
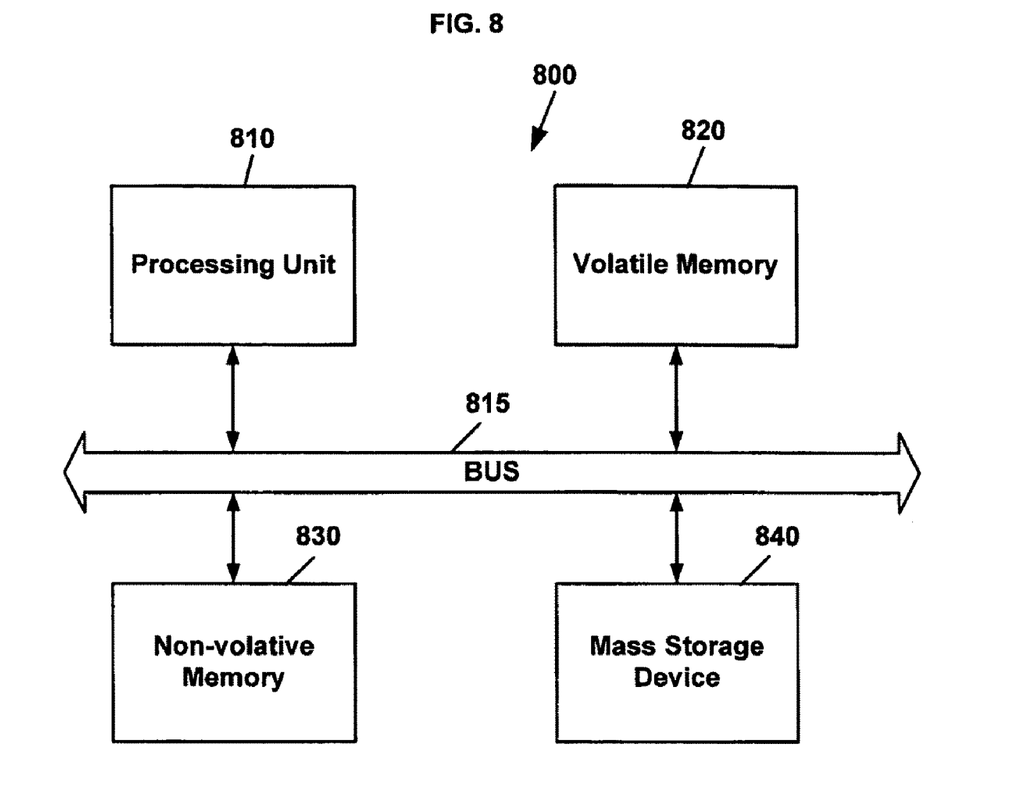
FIG. 8 is a block diagram of a computer system that may be used in accordance with at least one embodiment of the present invention.

FIG. 8 is a block diagram of a computer system that may be used in accordance with an embodiment of the present invention. In FIG. 8, a computer system 800 may include, but is not limited to, a processing unit (e.g., a processor) 810 connected to a bus 815 to enable processing unit 810 to have two-way communication across bus 815. The processing unit 810 may be a microprocessor, microcontroller, or the like, such as, for example, but not limited to, an Intel Pentium, Xenon, etc. microprocessor. In addition, processing unit 810 may be adapted to operate under the control of a variety of operating systems, for example, but not limited to, a Microsoft 32-bit and/or 64-bit operating system. Computer system 800 may also include a volatile memory (e.g., a random access memory (RAM)) 820 to store executable instructions and information/data to be used by the executable instructions when executed by processing unit 810. The executable instructions can be configured to cause the processor 810 to perform the functions described herein when executing the instructions. Computer system 800 may still further include a non-volatile memory (e.g., a read only memory (ROM)) 830 to store instructions and static information for processing unit 810, and a mass storage device (e.g., a hard disk drive, a compact disc (CD) and associated CD drive, an optical disk and associated optical disk drive, a floppy disk and associated floppy disk drive, etc.) 840 that each may also be connected to bus 815 to enable each to have two-way communication across bus 815. In operation, embodiments of the present invention may be resident in processing unit 810 while being executed. For example, executing programmed instructions may cause processing unit 810 to be configured to perform the functions described herein. The computer system illustrated in FIG. 8 may provide the basic features of a computer/server system that may be used in conjunction with embodiments of the present invention.

It is contemplated that embodiments of the present invention may also be used with computer/server systems that include additional elements not included in computer system 800 in FIG. 8. For example, these addition elements may include, but are not limited to, additional processing units (e.g., parallel processing units, graphics processing units, etc.), bridges and/or interfaces to a variety of peripherals (e.g., monitor, keyboard, mouse, printer, joystick, biometric devices, speakers, external communications devices (e.g., a LAN, a WAN, a modem, a router, etc.), and other peripheral devices).

Additionally, any configuration of the computer system in FIG. 8 may be used with the various embodiments of the present invention. The executable instructions (i.e., computer program) implementing the present invention may be stored in any memory or storage device accessible to processing unit 810, for example, but not limited to, volatile memory 820, mass storage device 840, or any other local or remotely connected memory or storage device.

Figure 9:
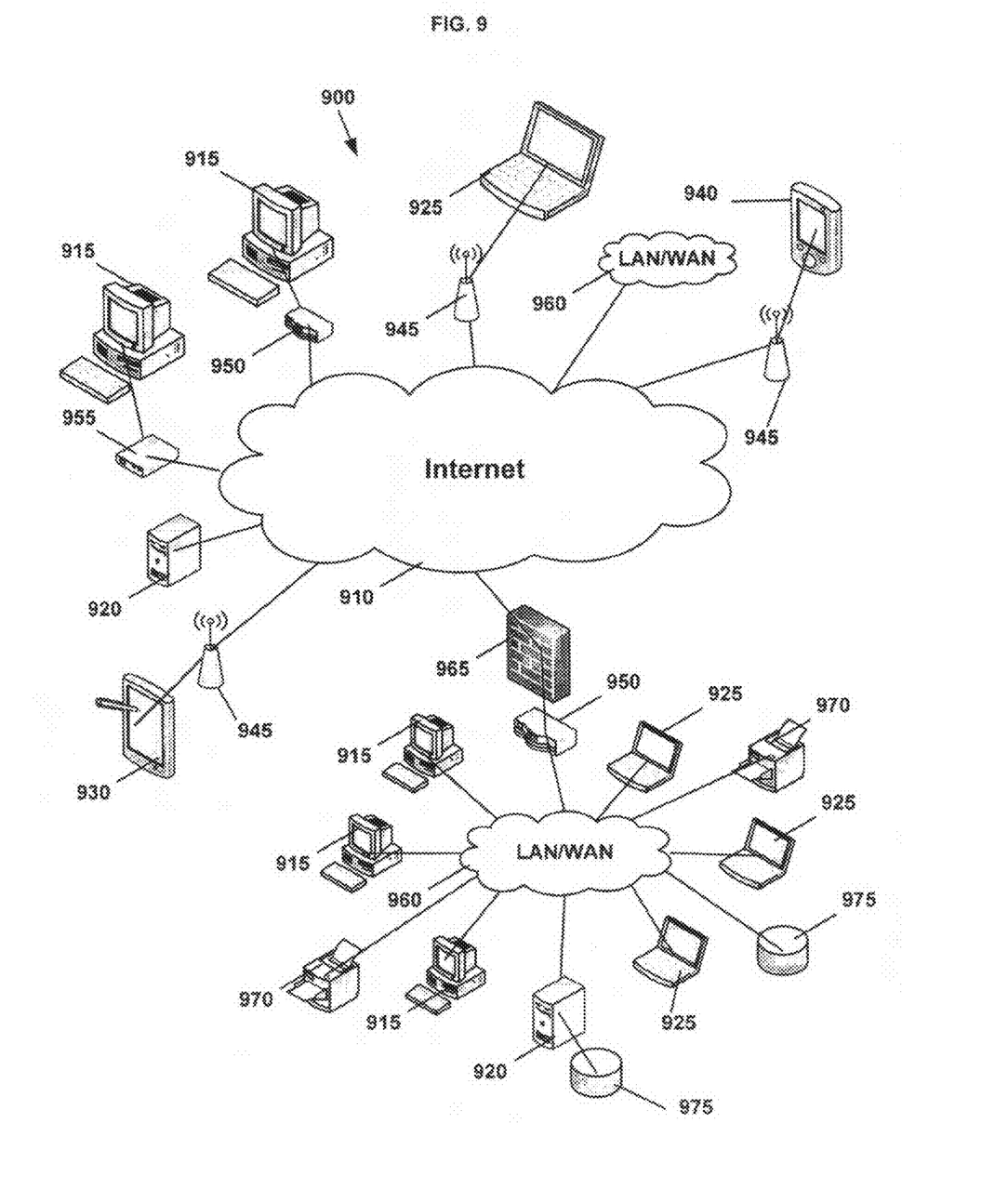
FIG. 9 is a diagram of a multiple network system that may be used in accordance with at least one embodiment of the present invention.

FIG. 9 is a diagram of a multiple network system that may be used together and/or separately in accordance with one or more embodiments of the present invention. In FIG. 9, Internet 910 may have connected to it a variety of computers, servers and communications devices. For example, multiple desktop personal computers (PCs) 915, servers 920, lap top PCs 925, tablet PCs 930, and personal digital assistants (PDAs) 940 may be connected to Internet 910 via a variety of communications means. The communications means may include wireless access points 945, such as seen connecting lap top PC 925, tablet PC 930, and PDA 940 to Internet 910; a router 950, as seen connecting a desktop PC to Internet 910; and a modem 955, as seen connecting another desktop PC to Internet 910. Internet 910 may also be connected to a LAN and/or WAN 960 via a firewall 965 and router 950. LAN and/or WAN 960 in turn may be directly connected to multiple desktop PCs 915, lap top PCs 925, multiple printers 970, one or more servers 920, and one or more mass storage devices 975, which may also be connected to one or more servers 920. Although the diagram in FIG. 9 is not exhaustive of all of the possible configurations and implementations, it is provided to illustrate a general network structure in which embodiments of the present invention may be implemented. Therefore, additional configurations and pieces of equipment are contemplated as being used with one or more embodiments of the present invention.

In accordance with one or more embodiments, each of the features of the present invention may be separately and independently claimed. Likewise, in accordance with one or more embodiments, each utility program, program, and/or code segment/module may be substituted for an equivalent means capable of substantially performing the same function(s).

In accordance with an embodiment of the present invention, a method as substantially shown and described herein.

In accordance with another embodiment of the present invention, a system and method as substantially shown and described herein.

In accordance with yet another embodiment of the present invention, a computer and method as substantially shown and described herein.

In accordance with still another embodiment of the present invention, a computer network and method as substantially shown and described herein.

In accordance with still another embodiment of the present invention, a method includes performing an analysis of all internal hard (logical) drives and scanning each folder to detect all files, and performing an analysis on those files.

In accordance with still another embodiment of the present invention, a method includes performing an analysis on all files and creating a Unique ID for each executable file which is installed within a Microsoft PC or Server.

In accordance with still another embodiment of the present invention, a method includes continuously scanning all internal hard (logical) drives, performing an analysis on all files to determine if any unauthorized modification has been made to any installed executable file.

Although the present invention has been disclosed in detail, it should be understood that various changes, substitutions, and alterations can be made herein. Moreover, although software and hardware are described to control certain functions, such functions can be performed using either software, hardware or a combination of software and hardware, as is well known in the art. Other examples are readily ascertainable by one skilled in the art and can be made without departing from the spirit and scope of the present invention as defined by the following claims.

What is claimed is:

1. A method of detecting and identifying each executable file contained on each of a plurality of hard drives attached to a computer, the method comprising:
    determining, using an operating system (O/S) utility program, a type of an O/S file system is configured within a file management system;
    determining how many entities, the types of entities, and information on each entity contained on each of a plurality of hard drive devices that are attached to a computer;
    determining whether each entity stored on each said hard drive device is a file or a folder;
    recording folder information for future analysis for each said entity determined to be a folder;
    by performing a binary analysis using an fread( ) function on the executable file; for each said executable file, retrieving all said file information and statistics about said executable file and generating a unique file identification (ID) using the retrieved information by
        retrieving a file creation date and time value for said executable file;
        retrieving a file last modification date and time value for said executable file;
        retrieving a file size value for said executable file;
        calculating a checksum value for said executable file;
        converting the file creation date and time, the file last modification date and time, and the file size values into strings; and
        calculating the unique file ID for said executable file by appending the strings in the following order: file size first, last modification date and time second, and checksum third; and
    storing the unique file ID in a database.

2. The method of claim 1 wherein the operating system (O/S) utility program comprises:
    a Microsoft operating system (O/S) utility program.

3. The method of claim 1 wherein the determining a type of an O/S file system is configured within the file management system comprises:
    calling a GetVolumeInformation( ) function to determine the kind of O/S file.

4. The method of claim 1 wherein the determining how many entities, the types of entities, and information on each entity on each of the plurality of hard drive devices that are attached to the computer comprises:
    calling a GetDriveType( ) function to determine how many entities, the types of entities, and information on each entity on each of the plurality of hard drive devices attached to the computer.

5. The method of claim 1 wherein the performing the binary analysis using the fread( ) function on the executable file comprises:
    performing the binary analysis using the fread( ) function on a first 30 bytes of the executable file.

6. A method of detecting and identifying each executable file contained on each of a plurality of hard drives attached to a computer, the method comprising:
    determining, using an operating system (O/S) utility program, a type of an O/S file system is configured within a file management system;
    determining how many, the types of, and information contained on each of a plurality of hard drive devices that are attached to a computer;
    determining whether each entity stored on each said hard drive device is a file or a folder;
    recording folder information for future analysis for each said entity determined to be a folder;
    determining whether each said file is an executable file for each said entity determined to be a file;
    for each said executable file, retrieving all said file information and statistics about said executable file and generating a unique file identification (ID) using the retrieved information; and
    storing the unique file ID in a database; wherein the generating the unique file ID using the retrieved information comprises:
        retrieving a file creation date and time value for the file;
        retrieving a file last modification date and time value for the file;
        retrieving a file size value for the file;
        calculating a checksum value for the file;

converting the file creation date and time, the file last modification date and time, and the file size values into strings; and calculating the unique file ID by appending the strings in the following order, file size first, last modification date and time second, and checksum third.

7. A method of detecting and identifying each executable file contained on each of a plurality of hard drives attached to a computer, the method comprising:

determining, using an operating system (O/S) utility program, a type of an O/S file system is configured within a file management system;

determining how many, the types of, and information contained on each of a plurality of hard drive devices that are attached to a computer;

determining whether each entity stored on each said hard drive device is a file or a folder;

recording folder information for future analysis for each said entity determined to be a folder;

determining whether each said file is an executable file for each said entity determined to be a file;

for each said executable file, retrieving all said file information and statistics about said executable file and generating a unique file identification (ID) using the retrieved information; and storing the unique file ID in a database;

continuously executing a plurality of parallel threads at a root of each said hard drive attached to the computer to determine which of the entities on each said hard drive are files and which are folders by if the current entity is determined to be a file,
  determining whether the current entity is executable; and
  if the current entity is executable,
    retrieving all critical file statistic information from the current entity;
    calculating a current unique file ID for the current entity using the retrieved information;
    comparing the current unique file ID with the stored unique file ID in the database;
    if the current unique file ID does not equal the stored unique file ID in the database, then the current entity is either quarantined or erased, depending on predetermined policy parameters;
    if the current unique file ID does not have a corresponding stored unique file ID in the database, then the current entity is either quarantined or erased, depending on the predetermined policy parameters; and
    if the current unique file ID does not have a corresponding stored unique file ID in the database and the current entity was not erased, storing the current unique file ID in the database as the unique file ID for the current entity;

if the current entity is determined to be a folder, comparing information about the current folder against the folder information recorded for future analysis to determine whether the current folder was previously analyzed and recorded;
  if the current folder was previously analyzed and recorded, then continuing with the next entity on the hard drive; and
  if the current folder was not previously analyzed and recorded, storing information on the current folder and passing the information to a parallel thread to perform an analysis on the contents of the folder.

8. The method of claim 7 wherein the calculating a current unique file ID for the current entity using the retrieved information comprises:

retrieving a file creation date and time value for the current entity;

retrieving a file last modification date and time value for the current entity;

retrieving a file size value for the current entity;

calculating a checksum value for the current entity;

converting the file creation date and time, the file last modification date and time, and the file size values into strings; and calculating the unique file ID for the current entity by appending the strings in the following order: file size first, last modification date and time second, and checksum third.

9. The method of claim 7 wherein if the current unique file ID does not have a corresponding stored unique file ID in the database and the entity is a file, then the current entity is quarantined until a unique file ID can be calculated and stored for the current entity; and if the current unique file ID has a corresponding stored unique file ID in the database, but the unique file ID values do not match, then the current entity is erased.

10. A method of continuously identifying whether each executable file contained on each of a plurality of hard drives attached to a computer has been changed, the method comprising:

continuously executing a plurality of parallel threads at a root of each hard drive attached to the computer to determine which of the entities on each hard drive are files and which are folders by if the entity is determined to be a file,
  determining whether the file is executable; and
  if the file is executable,
    retrieving all file and statistic information from the file;
    calculating a current unique file ID using the retrieved information;
    comparing the current unique file ID with a previously calculated unique file ID associated with the file that is stored in a database;
    if the current unique file ID does not equal the previously calculated unique file ID stored in the database, then the executable file is either quarantined or erased, depending on predetermined policy parameters;
    if the current unique file ID does not have a corresponding previously calculated unique file ID stored in the database, then the executable file is either quarantined or erased, depending on the predetermined policy parameters; and
    if the current unique file ID does not have a corresponding previously calculated unique file ID stored in the database and the executable file was not erased, storing the current unique file ID in the database as the unique file ID for the executable file;

if the entity is determined to be a folder, comparing information about the current folder against folder information previously recorded for future analysis to determine whether the current folder was previously analyzed and recorded;
  if the current folder was previously analyzed and recorded, then look at a next entity; and
  if the current folder was not previously analyzed and recorded, storing information on the current folder and passing it to a parallel thread to perform an analysis on the contents of the folder.

11. The method of claim 10 wherein the calculating a current unique file ID for the current entity using the retrieved information comprises:
retrieving a file creation date and time value for the current entity;
retrieving a file last modification date and time value for the current entity;
retrieving a file size value for the current entity;
calculating a checksum value for the current entity;
converting the file creation date and time, the file last modification date and time, and the file size values into strings; and
calculating the unique file ID for the current entity by appending the strings in the following order: file size first, last modification date and time second, and checksum third.

12. The method of claim 10 wherein if the current unique file ID does not have a corresponding stored unique file ID and the entity is a file, then the current entity is quarantined until a unique file ID can be calculated and stored for the current entity; and
if the current unique file ID has a corresponding stored unique file ID, but the unique file ID values do not match, then the current entity is erased.

13. A machine-readable medium having stored thereon a plurality of executable instructions for performing a method of continuously identifying whether each executable file contained on each of a plurality of hard drives attached to a computer has been changed, the method comprising:
continuously executing a plurality of parallel threads at a root of each hard drive attached to the computer to determine which of the entities on each hard drive are files and which are folders by
if the entity is determined to be a file,
determining whether the file is executable; and
if the file is executable,
retrieving all file and statistic information from the file;
calculating a current unique file ID using the retrieved information;
comparing the current unique file ID with a previously calculated unique file ID associated with the file that is stored in a database;
if the current unique file ID does not equal the previously calculated unique file ID stored in the database, then the executable file is either quarantined or erased, depending on predetermined policy parameters;
if the current unique file ID does not have a corresponding previously calculated unique file ID stored in the database, then the executable file is either quarantined or erased, depending on the predetermined policy parameters; and
if the current unique file ID does not have a corresponding previously calculated unique file ID stored in the database and the executable file was not erased, storing the current unique file ID as the unique file ID for the executable file in the database;
if the entity is determined to be a folder, comparing information about the current folder against folder information previously recorded for future analysis to determine whether the current folder was previously analyzed and recorded;

if the current folder was previously analyzed and recorded, then look at a next entity; and
if the current folder was not previously analyzed and recorded, storing information on the current folder and passing it to a parallel thread to perform an analysis on the contents of the folder.

14. The machine-readable medium of claim 13 wherein the calculating a current unique file ID for the current entity using the retrieved information comprises:
retrieving a file creation date and time value for the current entity;
retrieving a file last modification date and time value for the current entity;
retrieving a file size value for the current entity;
calculating a checksum value for the current entity;
converting the file creation date and time, the file last modification date and time, and the file size values into strings; and
calculating the unique file ID for the current entity by appending the strings in the following order: file size first, last modification date and time second, and checksum third.

15. The machine-readable medium of claim 13 wherein if the current unique file ID does not have a corresponding previously calculated unique file ID stored in the database and the entity is a file, then the current entity is quarantined until a unique file ID can be calculated and stored for the current entity; and
if the current unique file ID has a corresponding previously calculated unique file ID stored in the database, but the unique file ID values do not match, then the current entity is erased.

16. A method of detecting and identifying each executable file contained on each of a plurality of hard drives attached to a computer, the method comprising:
determining, using an operating system (O/S) utility program, a type of an O/S file system is configured within a file management system;
determining how many, the types of, and information contained on each of a plurality of hard drive devices that are attached to a computer;
determining whether each entity stored on each said hard drive device is a file or a folder;
recording folder information for future analysis for each said entity determined to be a folder;
determining whether each said file is an executable file for each said entity determined to be a file;
for each said executable file, retrieving all said file information and statistics about said executable file and generating a unique file identification (ID) using the retrieved information; and
storing the generated unique file ID in a database;
continuously executing a plurality of parallel threads at a root of each hard drive attached to the computer to determine which of the entities on each hard drive are files and which are folders by
if the current entity is determined to be a file,
determining whether the current entity is executable; and
if the current entity is executable,
retrieving all critical file statistic information from the current entity;
calculating a current unique file ID for the current entity using the retrieved information;
comparing the current unique file ID with the stored unique ID in the database;

if the current unique file ID does not equal the stored unique file ID in the database, then the current entity is either quarantined or erased, depending on predetermined policy parameters;

if the current unique file ID does not have a corresponding stored unique file ID in the database, then the current entity is either quarantined or erased, depending on the predetermined policy parameters; and if the current unique file ID does not have a corresponding stored unique file ID in the database and the current entity was not erased, storing in the database the current unique file ID as the unique file ID for the current entity;

if the current entity is determined to be a folder, compare information about the current folder against the folder information recorded for future analysis to determine whether the current folder was previously analyzed and recorded;

if the current folder was previously analyzed and recorded, then continuing with the next entity on the hard drive; and if the current folder was not previously analyzed and recorded, storing information on the current folder and passing the information to a parallel thread to perform an analysis on the contents of the folder.

17. The method of claim 16 wherein the calculating a current unique file ID for the current entity using the retrieved information comprises:

retrieving a file creation date and time value for the current entity;

retrieving a file last modification date and time value for the current entity;

retrieving a file size value for the current entity;

calculating a checksum value for the current entity;

converting the file creation date and time, the file last modification date and time, and the file size values into strings; and calculating the unique file ID for the current entity by appending the strings in the following order, file size first, last modification date and time second, and checksum third.

18. The method of claim 16 wherein if the current unique file ID does not have a corresponding stored unique file ID and the entity is a file, then the current entity is quarantined until a unique file ID can be calculated and stored for the current entity; and if the current unique file ID has a corresponding stored unique file ID, but the unique file ID values do not match, then the current entity is erased.

19. An apparatus comprising a computer system including a processing unit and a volatile memory, the computer system including:

means for determining, using an operating system (O/S) utility program, a type of an O/S file system is configured within a file management system;

means for determining how many entities, the types of entities, and information on each entity contained on each of a plurality of hard drive devices that are attached to a computer;

means for determining whether each entity stored on each said hard drive device is a file or a folder;

means for recording folder information for future analysis for each said entity determined to be a folder;

means for determining whether each said file is an executable file for each said entity determined to be a file by performing a binary analysis using an fread( ) function on the executable file;

means for, for each said executable file, retrieving all said file information and statistics about said executable file and generating a unique file identification (ID) using the retrieved information including:

means for retrieving a file creation date and time value for said executable file;

means for retrieving a file last modification date and time value for said executable file;

means for retrieving a file size value for said executable file;

means for calculating a checksum value for said executable file;

means for converting the file creation date and time, the file last modification date and time, and the file size values into strings; and means for calculating the unique file ID for said executable file by appending the strings in the following order: file size first, last modification date and time second, and checksum third; and means for storing the unique file ID in a database.

20. The apparatus of claim 19 wherein the operating system (O/S) utility program comprises:

a Microsoft operating system (O/S) utility program.

21. The apparatus of claim 19 wherein the means for determining a type of an O/S file system is configured within the file management system comprises:

calling a GetVolumeInformation( ) function to determine the kind of O/S file.

22. The apparatus of claim 19 wherein the means for determining how many entities, the types of entities, and information on each entity contained on each of the plurality of hard drive devices that are attached to the computer comprises:

calling a GetDriveType( ) function to determine how many, the types of, and information on the hard drive devices attached to the computer.

23. The apparatus of claim 19 wherein the means for performing the binary analysis using the fread( ) function on the executable file comprises:

performing the binary analysis using the fread( ) function on a first 30 bytes of the executable file.

24. An apparatus comprising a computer system including a processing unit and a volatile memory, the computer system including:

means for determining, using an operating system (O/S) utility program, a type of an O/S file system is configured within a file management system;

means for determining how many, the types of, and information contained on each of a plurality of hard drive devices that are attached to a computer;

means for determining whether each entity stored on each said hard drive device is a file or a folder;

means for recording folder information for future analysis for each said entity determined to be a folder;

means for determining whether each said file is an executable file for each said entity determined to be a file;

means for, for each said executable file, retrieving all said file information and statistics about said executable file and generating a unique file identification (ID) using the retrieved information; and means for storing the unique file ID in a database, wherein the means for generating the unique file ID using the retrieved information comprises:

retrieving a file creation date and time value for the file;
retrieving a file last modification date and time value for the file;
retrieving a file size value for the file;
calculating a checksum value for the file;
converting the file creation date and time, the file last modification date and time, and the file size values into strings; and
calculating the unique file ID by appending the strings in the following order, file size first, last modification date and time second, and checksum third.

25. An apparatus comprising a computer system including a processing unit and a volatile memory, the computer system including:
  means for determining, using an operating system (O/S) utility program, a type of an O/S file system is configured within a file management system;
  means for determining how many, the types of, and information contained on each of a plurality of hard drive devices that are attached to a computer;
  means for determining whether each entity stored on each said hard drive device is a file or a folder;
  means for recording folder information for future analysis for each said entity determined to be a folder;
  means for determining whether each said file is an executable file for each said entity determined to be a file;
  means for, for each said executable file, retrieving all said file information and statistics about said executable file and generating a unique file identification (ID) using the retrieved information; and
  means for storing the unique file ID in a database;
  means for continuously executing a plurality of parallel threads at a root of each said hard drive attached to the computer to determine which of the entities on each said hard drive are files and which are folders by
  if the current entity is determined to be a file,
    determining whether the current entity is executable; and
    if the current entity is executable,
      retrieving all critical file statistic information from the current entity;
      calculating a current unique file ID for the current entity using the retrieved information;
      comparing the current unique file ID with the previously generated unique file ID stored in the database;
      if the current unique file ID does not equal the previously generated unique file ID stored in the database, then the current entity is either quarantined or erased, depending on predetermined policy parameters;
      if the current unique file ID does not have a corresponding previously generated unique file ID stored in the database, then the current entity is either quarantined or erased, depending on the predetermined policy parameters; and
      if the current unique file ID does not have a corresponding previously generated unique file ID stored in the database and the current entity was not erased, storing the current unique file ID in the database as the unique file ID for the current entity;
  means for, if the current entity is determined to be a folder, comparing information about the current folder against the folder information recorded for future analysis to determine whether the current folder was previously analyzed and recorded;
    if the current folder was previously analyzed and recorded, then continuing with the next entity on the hard drive; and
    if the current folder was not previously analyzed and recorded, storing information on the current folder and passing the information to a parallel thread to perform an analysis on the contents of the folder.

26. The apparatus of claim 25 wherein the means for calculating a current unique file ID for the current entity using the retrieved information comprises:
  retrieving a file creation date and time value for the current entity;
  retrieving a file last modification date and time value for the current entity;
  retrieving a file size value for the current entity;
  calculating a checksum value for the current entity;
  converting the file creation date and time, the file last modification date and time, and the file size values into strings; and
  calculating the unique file ID for the current entity by appending the strings in the following order: file size first, last modification date and time second, and checksum third.

27. The apparatus of claim 25 wherein if the current unique file ID does not have a corresponding previously generated unique file ID stored in the database and the entity is a file, then the current entity is quarantined until a unique file ID can be calculated and stored for the current entity; and
  if the current unique file ID has a corresponding previously generated unique file ID stored in the database, but the unique file ID values do not match, then the current entity is erased.

* * * * *